(12) United States Patent
Studer

(10) Patent No.: US 7,513,731 B2
(45) Date of Patent: Apr. 7, 2009

(54) TRUCK BED ELEVATOR

(76) Inventor: Ronald M. Studer, 1820 E. Mansfield St., Bucyrus, OH (US) 44820

( * ) Notice: Subject to any disclaimer, the term of this patent is extended or adjusted under 35 U.S.C. 154(b) by 650 days.

(21) Appl. No.: 10/935,561

(22) Filed: Sep. 7, 2004

(65) Prior Publication Data

US 2005/0118006 A1 Jun. 2, 2005

Related U.S. Application Data

(60) Provisional application No. 60/501,290, filed on Sep. 9, 2003.

(51) Int. Cl.
*B60P 1/04* (2006.01)
(52) U.S. Cl. .................. 414/477; 414/491; 414/542
(58) Field of Classification Search ......... 414/477–478, 414/479, 491, 540–541, 634–636
See application file for complete search history.

(56) References Cited

U.S. PATENT DOCUMENTS

| | | | | |
|---|---|---|---|---|
| 4,498,829 A | * | 2/1985 | Spikes | 414/24.5 |
| 4,790,711 A | * | 12/1988 | Calaway | 414/635 |
| 4,943,203 A | * | 7/1990 | Bohata | 414/486 |
| 5,011,363 A | * | 4/1991 | Conley et al. | 414/666 |
| 5,391,043 A | * | 2/1995 | Bohata et al. | 414/544 |
| 5,542,803 A | * | 8/1996 | Driggs | 414/111 |
| 5,556,076 A | * | 9/1996 | Jacquay | 254/8 R |
| 5,618,150 A | * | 4/1997 | Poindexter | 414/477 |
| 5,651,657 A | * | 7/1997 | Poindexter | 414/541 |
| 5,816,764 A | * | 10/1998 | Bohata | 414/477 |
| 5,975,824 A | | 11/1999 | Hostetler | |
| 6,003,463 A | * | 12/1999 | Giesler | 114/259 |
| 6,196,634 B1 | | 3/2001 | Jurinek | |
| 6,328,520 B1 | * | 12/2001 | Maclay | 414/111 |
| 6,558,104 B1 | * | 5/2003 | Vlaanderen et al. | 414/498 |

\* cited by examiner

*Primary Examiner*—Charles A. Fox
*Assistant Examiner*—Charles N. Greenhut
(74) *Attorney, Agent, or Firm*—Pearne & Gordon LLP

(57) ABSTRACT

A cargo loading and unloading system for a vehicle comprising a rail pivotally connected to the vehicle, a raising apparatus for raising the rail from a rest position to an elevated position, a lifting attachment that projects from the rail and which is moveable along a portion of the rail, and a lifting attachment driving mechanism for moving the lifting attachment along the portion of the rail.

35 Claims, 9 Drawing Sheets

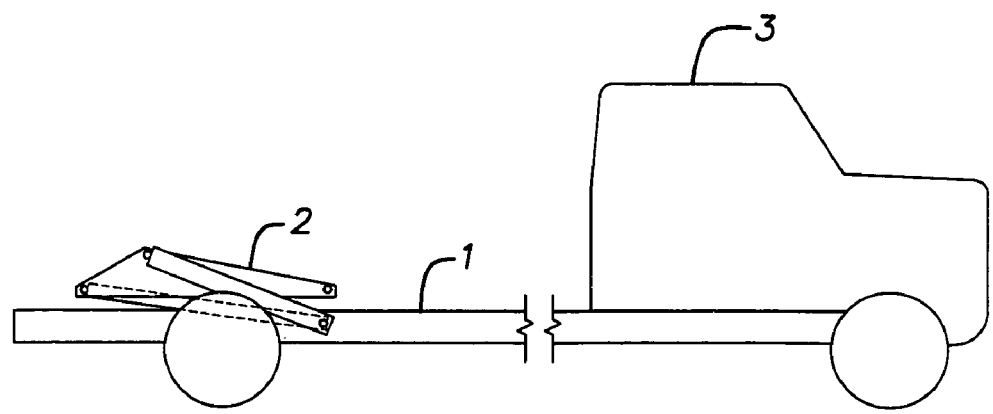
FIG. 1
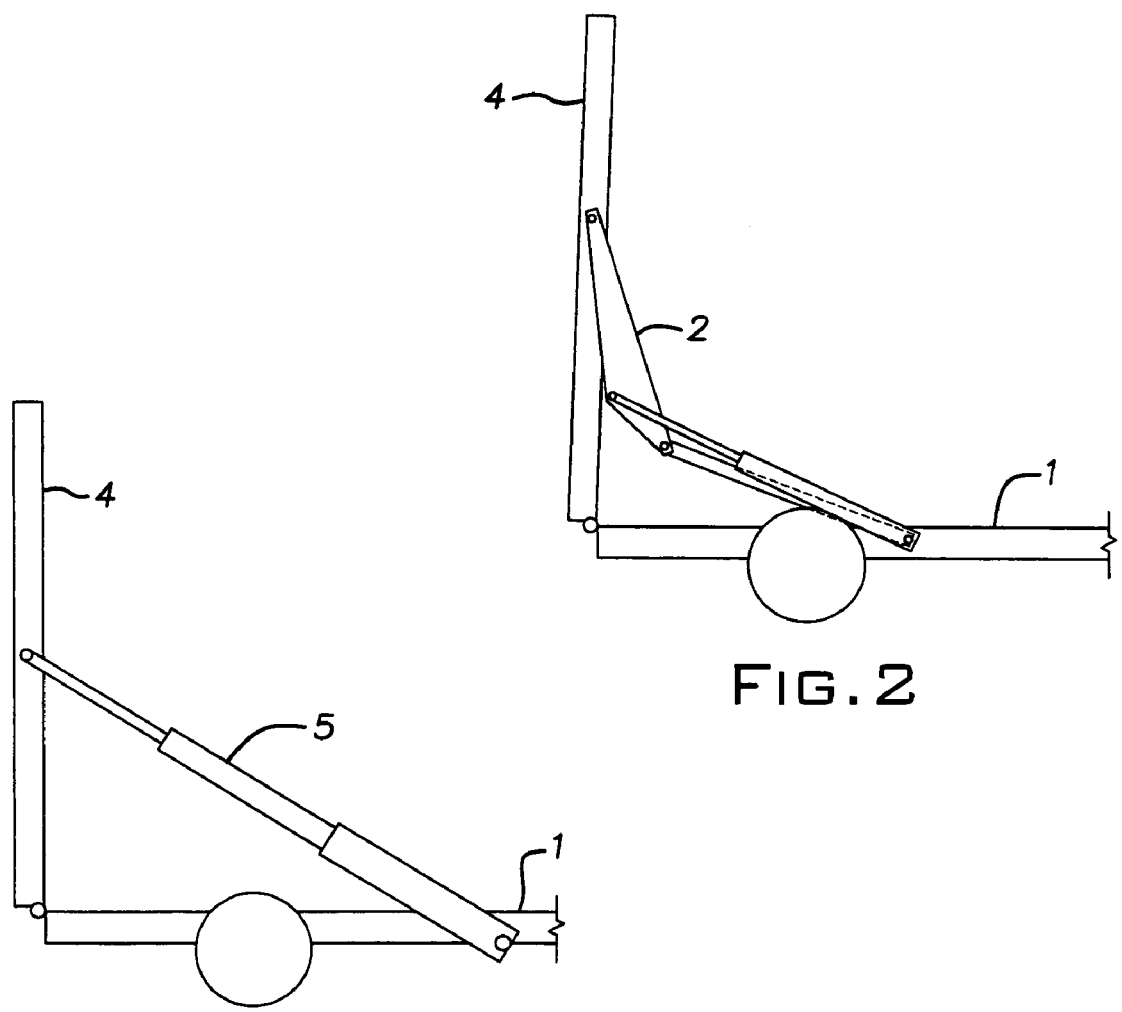
FIG. 2
FIG. 3

TRUCK BED ELEVATOR

This application claims the benefit of provisional patent application Ser. No. 60/501,290, filed on Sep. 9, 2003, incorporated herein by reference in its entirety.

This application relates generally to a truck modification to aid in positioning loads.

More specifically, this application relates to several embodiments of a moving vertical lift or utility platform installed in a truck or other utility vehicle that will move the cargo to or from a position in which the cargo can be more easily loaded or unloaded.

BACKGROUND OF THE INVENTION

Loading and unloading heavy, large, or awkwardly shaped cargo from a truck or other utility vehicle is a common difficulty for the vehicle's operator, particularly in situations where the operator is working alone and must perform these tasks without assistance from others. These difficulties can result in time delays and risks of injury.

Therefore, there exists a need in the art for a mechanical apparatus that safely transports the cargo of a truck to or from a position in which the cargo can be safely loaded or unloaded, with minimal lifting or carrying required.

SUMMARY OF THE INVENTION

Provided is a cargo loading and unloading system for a vehicle comprising a rail pivotally connected to the vehicle, a raising apparatus for raising the rail from a rest position to an elevated position, a lifting attachment that projects from the rail and which is moveable along a portion of the rail, and a lifting attachment driving mechanism for moving the lifting attachment along the portion of the rail.

Further provided is a cargo loading and unloading system for a vehicle comprising a bed, a rail pivotally connected to the bed, a raising apparatus for raising the rail from a rest position that is substantially parallel to the bed at rest through an elevated position that is substantially perpendicular to the bed at rest, a lifting attachment that projects from the rail and which is moveable along a portion of the rail, and a lifting attachment driving mechanism for moving the lifting attachment along the portion of the rail.

Further provided is a cargo loading and unloading system for a vehicle having a bed comprising a rail pivotally connected to the bed and extending through an opening in the bed, a raising apparatus for raising the rail from a rest position that is substantially parallel to the bed at rest to an elevated position that is substantially perpendicular to the bed at rest, a fork that projects from the rail and which is moveable along a portion of the rail, and a driving mechanism for moving the fork along the portion of the rail.

Further provided is a cargo loading and unloading system for a vehicle comprising a bed, a first rail pivotally connected to the bed and extending through a first opening in the bed, a second rail pivotally connected to the bed and extending through a second opening in the bed, a raising apparatus for raising the rail from a rest position that is substantially parallel to the bed at rest through an elevated position that is substantially perpendicular to the bed at rest, a first fork that projects from the first rail and which is moveable along a portion of the first rail, a second fork that projects from the second rail and which is moveable along a portion of the second rail, and a driving mechanism for moving one or both of the first fork along the portion of the first rail and the second fork along the portion of the second rail.

Further provided is a cargo loading and unloading system for a vehicle having a bed comprising a first rail pivotally connected to the bed and extending through a first opening in the bed, wherein the first rail includes a first channel along a part of its length, a second rail pivotally connected to the bed and extending through a second opening in the bed, wherein the second rail includes a second channel along a part of its length, and a raising apparatus for raising one or both of the first rail and the second rail from a rest position that is substantially parallel to the bed at rest to an elevated position that is substantially perpendicular to the bed at rest.

Further provided is a cargo loading and unloading system for a vehicle comprising a bed, a first rail pivotally connected to the bed and extending through a first opening in the bed, wherein the first rail is comprised of a first beam and first track, a second rail pivotally connected to the bed and extending through a second opening in the bed, wherein the second rail is comprised of a second beam and a second track, a raising apparatus for raising the first rail and the second rail from a rest position that is substantially parallel to the bed at rest through an elevated position that is substantially perpendicular to the bed at rest, a first fork which projects from the first rail and which is movable along the first track, a second fork which projects from the second rail and which is movable along the second track, and means for securing the bed to one or more of the first rail and the second rail.

Further provided is a method of modifying a truck comprising the steps of providing a truck having a bed, providing a first rail, a second rail, a raising apparatus, and a lifting attachment, installing the first rail and the second rail on the truck so that the first rail and the second rail are able to pivot away from the bed, installing the raising apparatus so that the raising apparatus is able to raise one or more of the first rail and the second rail from a rest position that is substantially parallel to the bed at rest through an elevated position that is substantially perpendicular to the bed at rest, and attaching the lifting attachment to one or both of the first rail and the second rail.

BRIEF DESCRIPTION OF THE DRAWINGS

FIG. 1 is a side view of a vehicle having a scissor jack apparatus for pivoting of the rail/movement of the cargo;

FIG. 2 is a side view of a vehicle with scissor jack extended and attached to the bed/rail, thus providing a vertical position for the bed/rail;

FIG. 3 is a side view of a vehicle with a multiple stage (telescoping) hydraulic cylinder apparatus extended and attached to the bed/rail;

DETAILED DESCRIPTION OF THE PREFERRED EMBODIMENTS

Figure 4:
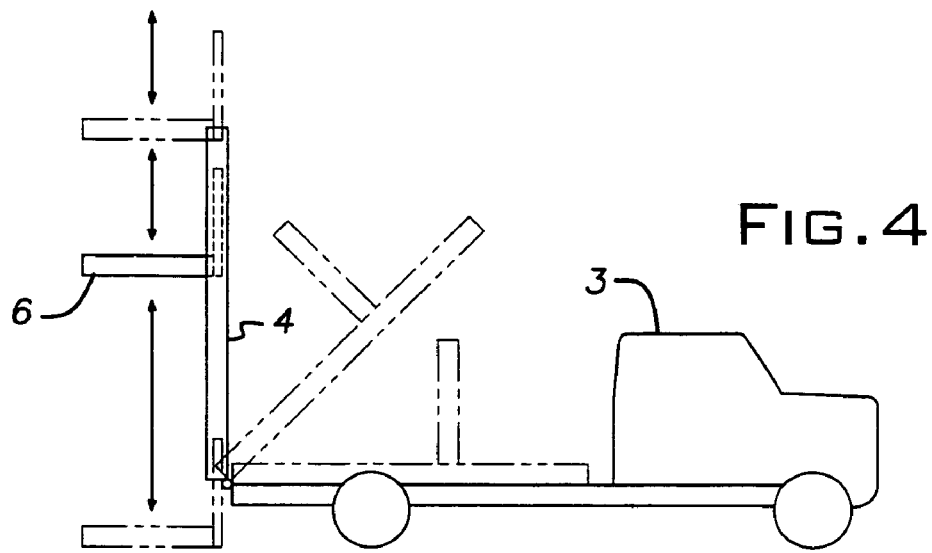
FIG. 4 is a side view of a vehicle having a pivoting bed/rail upon which a rigid platform is mounted and positionable along the length of the bed/rail.

FIGS. 1, 2 and 3 represent different ways of achieving vertical lift on a truck bed 1 or other utility platform. FIGS. 1 and 2 demonstrate a raising apparatus for achieving vertical lift by altering scissor jack components, scissor jack location and/or hydraulic cylinder stroke length.

A side view of the vehicle is shown in FIGS. 1 and 2 with a scissor jack 2 assembly, one embodiment of the raising apparatus, utilized to lift a bed and/or rail (bed/rail) 4 assembly pivotally attached to the back of the truck or other vehicle 3. In a rest position, the bed/rail 4 is substantially flat against the truck, substantially parallel to the ground and the truck frame. In an extended, or vertical, position of the bed/rail 4, the bed/rail 4 is substantially perpendicular to the rest position of the bed/rail, and cargo may be secured to the bed/rail 4 and then lowered back into the truck 3. The bed/rail 4 subsystem may be configured to allow for lifting of the rail alone or lifting of both the bed and rail together. As shown in FIG. 3, a multiple stage (telescoping) hydraulic cylinder jack or hydraulic ram 5 may also be used as a raising apparatus to lift the bed/rail 4 from the truck bed 1. Other raising apparatus alternatives are also contemplated, for example a winch and pulley system or a geared jacking mechanism (not shown).

FIG. 4 represents a truck or other utility vehicle 3 equipped with a bed/rail 4 that achieves vertical lift using a lifting attachment 6, for example a rigid platform or fork(s), attached to the bed/rail 4 and that can move in the directions indicated by arrow. The lifting attachment 6 may extend between and move along two rails, for example a driver's side rail and a passenger's side rail. Alternatively, each rail may have its own narrow platform or fork 6, for supporting cargo. The movement of the platform or fork 6 is made possible by a lifting attachment driving mechanism, for example a hydraulic ram, a cable system, a geared system, or a screw drive mechanism contained partly or entirely within the rail portion of the bed/rail 4 shown. The platform or fork 6 may be movable along the entire length of the rails or along a portion of the rails. When the bed and/or rail(s) are substantially vertical, the platform or forks 6 may be lowered for easier loading of cargo onto the platform or forks 6 by an operator.

Figure 5:
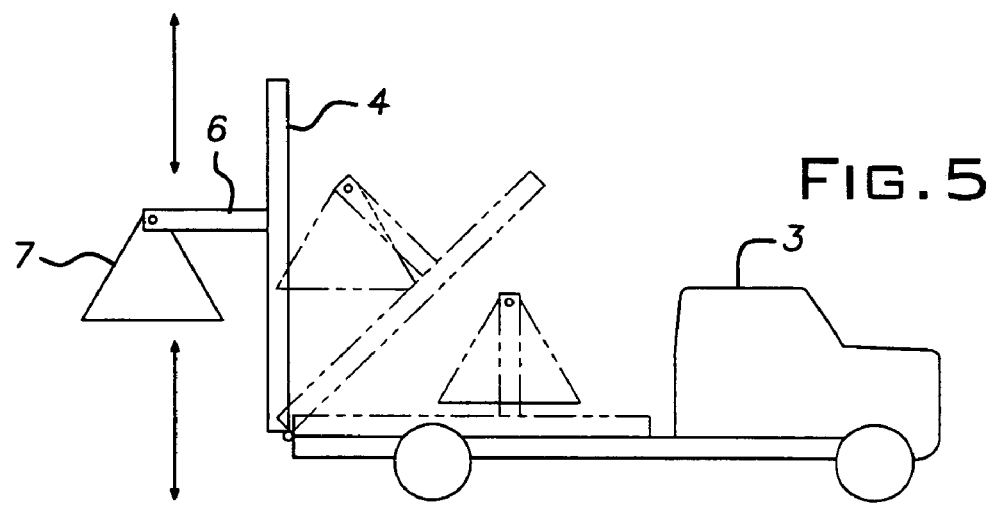
FIG. 5 is a side view of a vehicle having a pivoting bed/rail upon which a rigid platform is mounted, with a swinging platform attachment connected to the end of the member.

FIG. 5 represents a truck or other utility vehicle 3 with a platform attachment 7 connected to the platform or forks 6. The platform attachment 7 swings so as to remain substantially horizontal throughout the movement of the bed/rail 4 or the forks 6. This is useful in loading or unloading tools or cargo. The swinging platform attachment 7 may be connected to the forks, so that the loaded cargo may remain in an upright position as the bed/rail 4 is extended or retracted. The platform attachment 7 may be substantially free swinging, or may incorporate a motion dampening device to retard free swinging, for example a friction device, or an elastic or gas spring or shock absorber mechanism.

Figure 6:
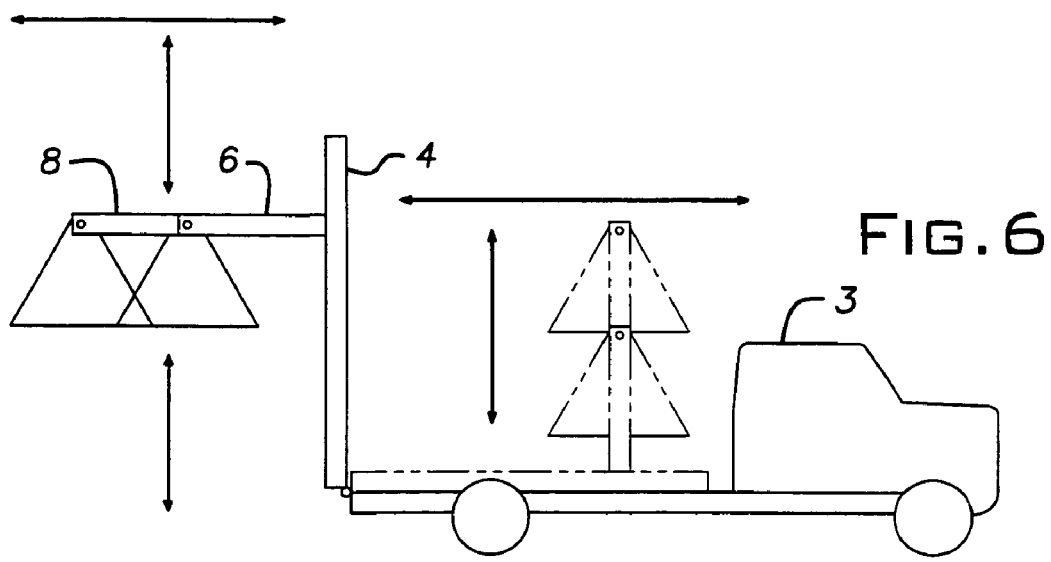
FIG. 6 is a side view of a vehicle having a pivoting bed/rail upon which an extendable rigid platform is mounted, with a swinging support attachment connected to the end of the member; 1

A further embodiment, shown in FIG. 6, represents a truck or other utility vehicle 3 with an extension 8 added to the rigid platform or forks 6. This extension 8 can retract into or out of the platform or forks 6 allowing cargo to be lifted and moved over other cargo and will aid in the placement of the cargo once the bed/rail 4 is in a vertical position. In terms of using the system thus far described as a work platform/scaffolding, the advantages of positioning the cargo apply to positioning the scaffolding as well. The embodiment of FIG. 6 provides retractable extensions 8 to the platform or forks 6, which facilitate placement of the cargo when loading and unloading.

Figure 7:
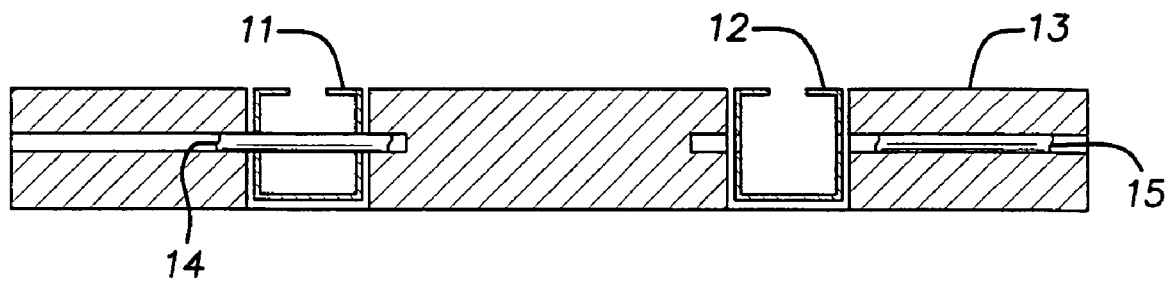
FIG. 7 is a cross-sectional view of the bed and rail, with a pin removably inserted through the bed and rail.

FIG. 7 represents one embodiment of the bed and rail assembly. A first rail 11 and a second rail 12 are installed in openings in the truck bed 13. This allows the rails 11, 12 to be substantially flush with the truck bed 13 when in the lowered or rest position. The left side of FIG. 7 illustrates a first pin 14 inserted through the bed 13 and rail 11 to secure the rail to the bed. In this condition, the bed 13 and rail 11 will move as one piece when lifted according to the different techniques shown on FIGS. 1, 2 and 3. The right side of FIG. 7 illustrates a second pin 15 not yet inserted into the rail 12, disconnecting the bed from that rail 12. When both rails 11, 12 are so disconnected from the bed 13, the rails 11, 12 will rise and the bed 13 will remain still when the rails 11, 12 are lifted by the different mechanisms described on FIGS. 1, 2 and 3. In this manner, the rails 11, 12 can be attached/detached from the bed 13 by inserting/removing the pins 14, 15. Preferably, both pins would be inserted or removed to lift or not lift the bed along with the rails, as desired.

As discussed above, the bed 13 and rails 11, 12 can be fastened together by inserting pins 14, 15 through openings in the bed and rail at the non-pivoting end of the bed/rail system, as shown in FIG. 7. When the bed 13 is disconnected from the rails 11, 12, cargo can be lifted and then placed onto the bed 13 of the truck or other utility vehicle by movement of the platform/forks and rails 11, 12. Cargo can also be lifted and carried over or positioned beyond other cargo already present on the truck bed 13. Alternative methods of securing the bed 13 and rails 11, 12 could be utilized. For example a bolt and nut system, or a clamping system could be used. Further, the pins could be operated by levers, or prevented from being fully withdrawn from the bed to prevent loss, for example.

Figure 8:
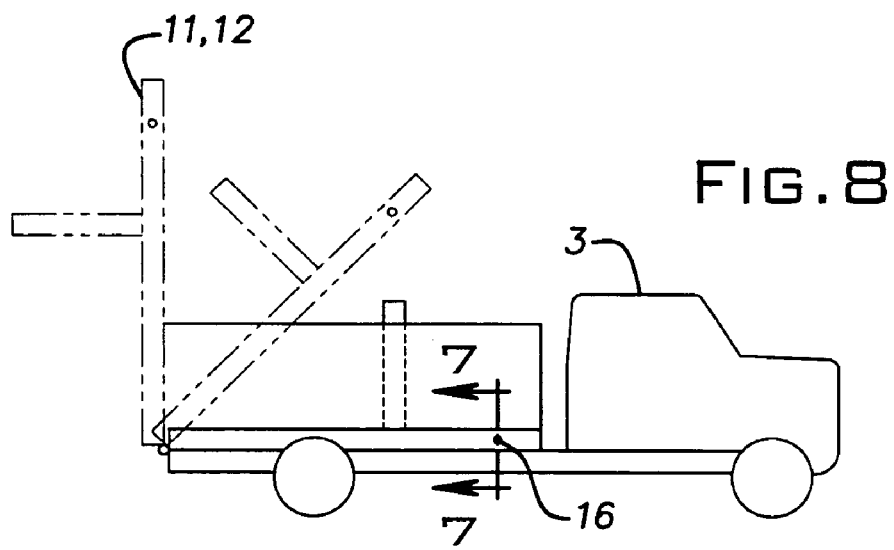
FIG. 8 is a side view of a vehicle having a pivoting rail with a location on the non-pivoting end for insertion of a pin.

FIG. 8 represents the rails 11, 12 being disconnected from the bed of the truck or other utility vehicle 3 (such as by removing the pins, as discussed above) and moving the rails into a vertical position, while the bed remains stationary. Also represented is a generalized location 16 for inserting or retracting the pins that connect or disconnect the bed and rails 11, 12 to or from each other. Thus, when the pins are removed, the rail can be raised without raising the bed, as shown in FIG. 8.

Figure 9:
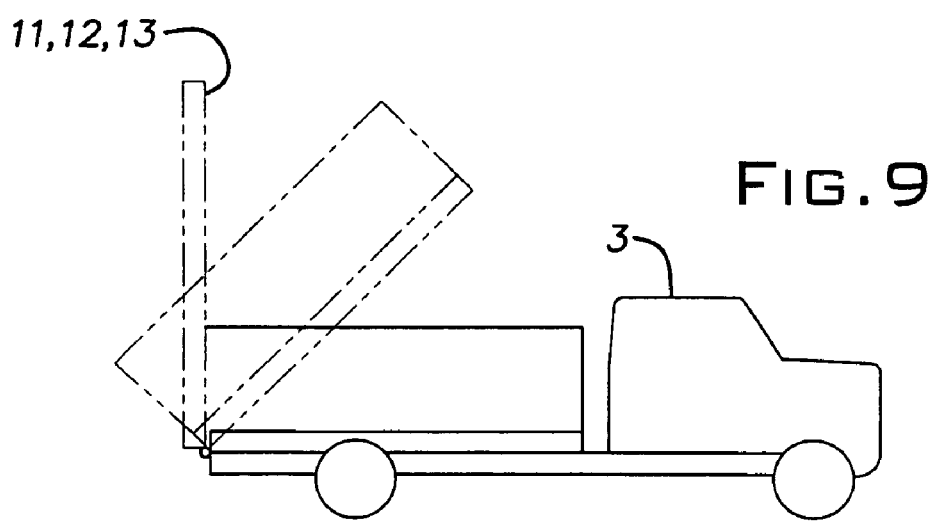
FIG. 9 is a side view of a vehicle having a pivoting bed/rail, where the entire bed/rail system is tilted for a dumping position.
Figure 10:
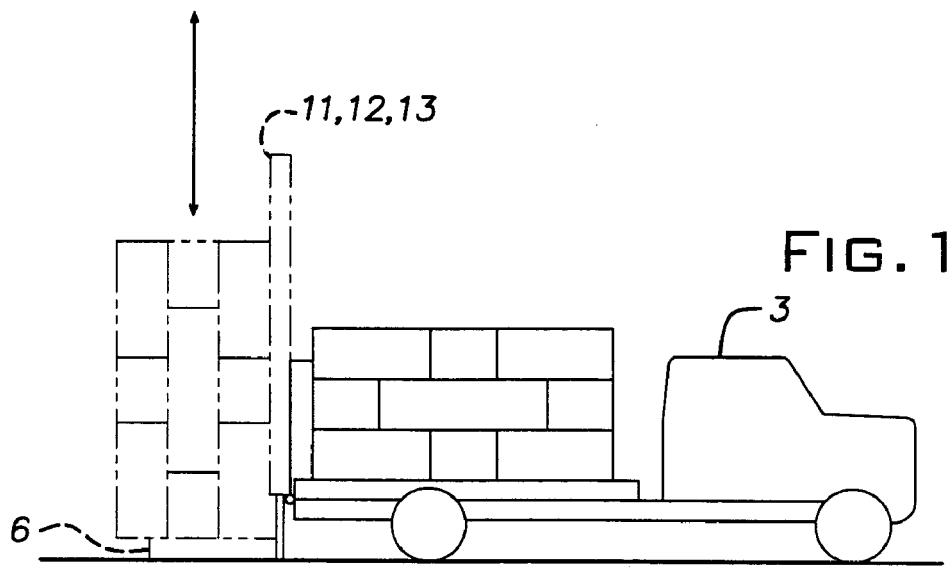
FIG. 10 is a side view of a vehicle having a pivoting bed/rail with loaded cargo, where the entire bed/rail system is pivoted to a vertical position for loading/unloading the cargo.

FIGS. 9 and 10 show the rails 11, 12 being connected to the bed 13 of a truck or other utility vehicle 3 and the connected bed and rail assembly 11, 12, 13 being lifted to a dumping or lifting position. When the pin is installed, operation of the system provides rotation of the bed and rail together. FIG. 9 shows a dumping operation in which no platform or forks are attached to the rails 11, 12. FIG. 10 shows the rails 11, 12 being connected to the bed of a truck or other utility vehicle 3 and the entire bed and rail assembly 11, 12, 13, with rigid platform or forks 6 attached, being lifted to a vertical position for cargo delivery (such as for hay bales or bricks, for example).

Figure 11:
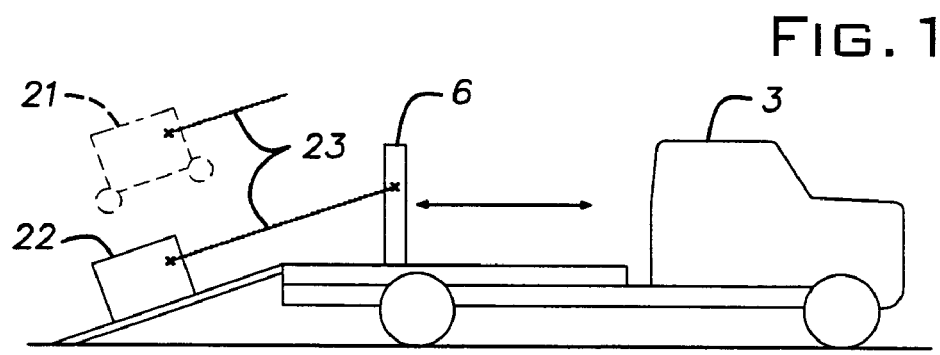
FIG. 11 is a side view of a vehicle having a rigid platform attached to the bed, where the platform is movable along the length of the bed to pull cargo attached to the platform onto the bed.

FIG. 11 represents the rigid platform or forks 6 being used to either load or unload a wheeled 21 or un-wheeled 22 piece of heavy cargo by using the rail drive mechanisms to push or pull the cargo horizontally. The rigid platform or forks 6 may be provided with a means for attaching a piece of cargo, through use of a cable 23 or similar connection, which can be pulled onto the vehicle bed when the rigid platform is moved along the rail toward the front of the vehicle. A winch or similar device can be used to wind the cable 23 to pull the cargo 21, 22 onto the bed.

Figure 12:
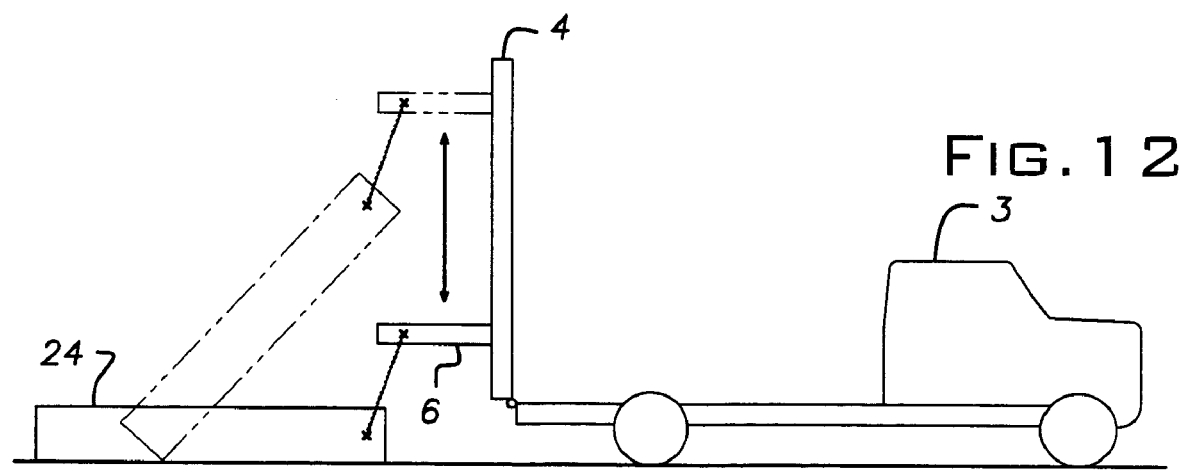
FIG. 12 is a side view of a vehicle having a rigid platform attached to the bed/rail, which is pivoted into the vertical position, where the platform is moved vertically along the rail to lift the attached cargo.
Figure 13:
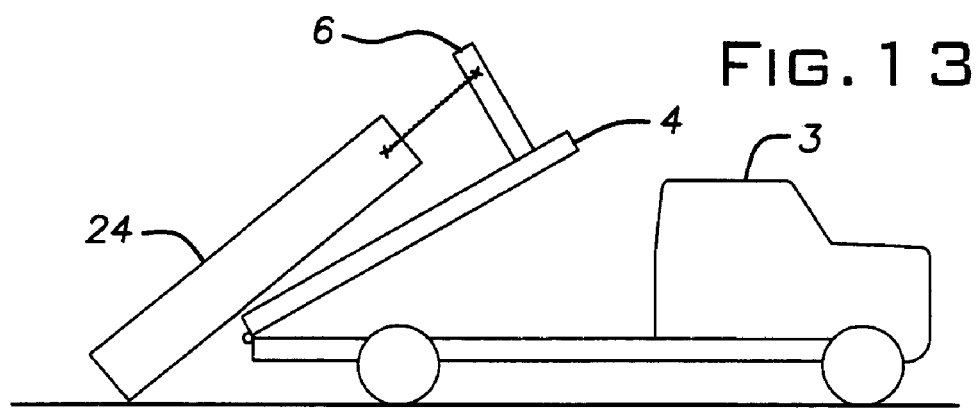
FIG. 13 is a side view of a vehicle having a rigid platform attached to the bed/rail, which is pivoted into an acute angle position, where the platform is moved along the rail to pull the attached cargo onto the bed/rail.
Figure 14:
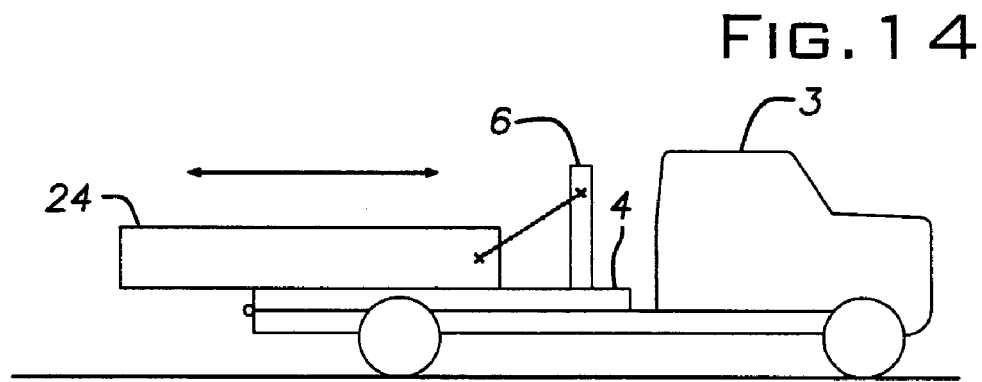
FIG. 14 is a side view of a vehicle having a rigid platform attached to the bed/rail, which has returned to the horizontal position, where the platform is moved along the rail to pull the attached cargo fully onto the bed.

FIGS. 12, 13, 14 represent loading a heavy piece of cargo by using the rigid platform or forks 6 to raise the cargo 24 vertically (FIG. 12), lowering the cargo 24 onto the truck bed or other utility vehicle 3 (FIG. 13), then pulling the cargo 24 the rest of the way onto the truck bed or other utility vehicle 3 using the rigid platform or forks 6 thus putting the bed rails in a rest position (FIG. 14). The cargo 24 can be unloaded by reversing the procedures. FIGS. 12, 13, and 14 show a loading operation in which the bed/rail 4 is extended to the vertical position and the platform or forks 6 are lowered for attachment to the cargo 24 and then raised for lifting of the cargo 24 (FIG. 12), the bed/rail 4 is then lowered to move the cargo 24 onto the vehicle 3 (FIG. 13), and then the platform or forks 6 are further moved to pull the cargo 24 fully onto the vehicle 3.

Figure 15:
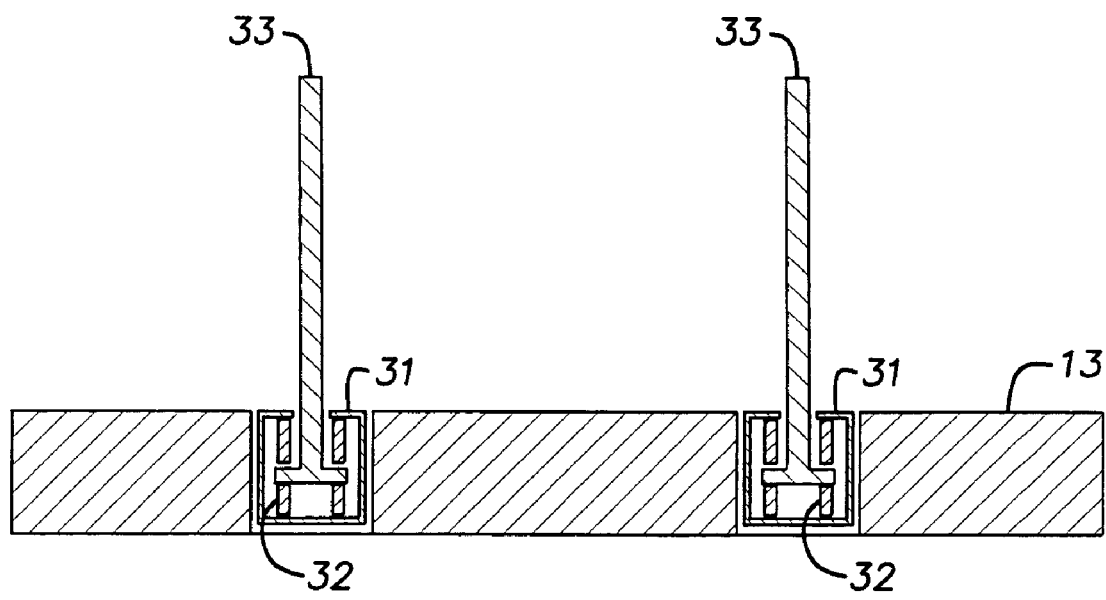
FIG. 15 is an end cross-sectional view of the bed/rail system with rigid platform and guide or gear wheels for moving the platform along the rails.

FIG. 15 shows an embodiment of the bed/rail system in which the rails 31 are installed in openings in the truck bed 13. The rails 31 contain guide or gear wheels 32 along which the forks 33 may move. The guide wheels 32 may be attached to and move with the forks 33, or, alternatively, may be attached to the rails 31.

Figure 16:
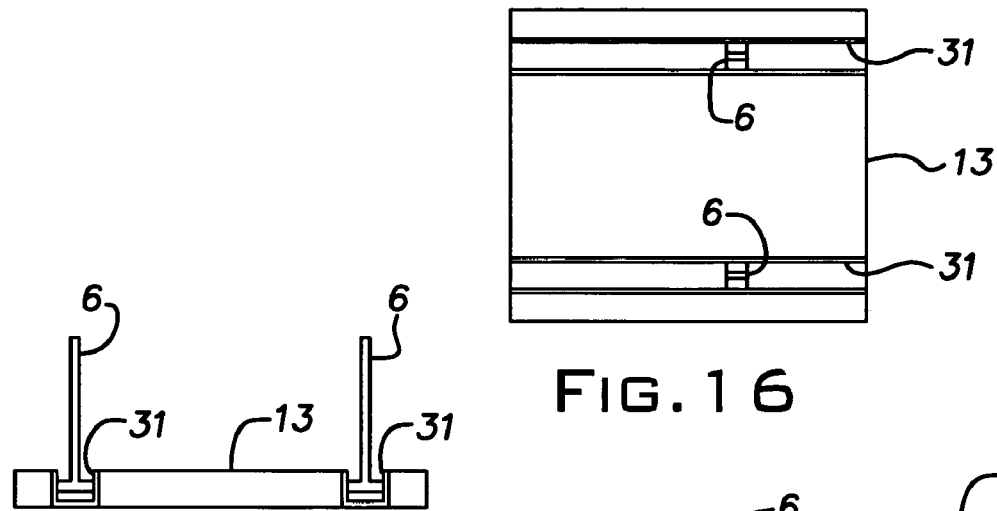
FIG. 16 is a top view of the bed/rail system with rigid platform.
Figure 17:
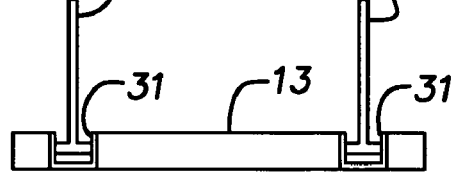
FIG. 17 is a cross-sectional end view of the bed/rail system with rigid platform.
Figure 18:
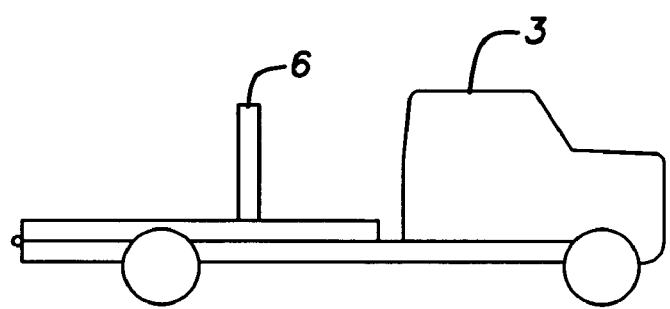
FIG. 18 is a side view of a vehicle having the bed/rail system with rigid platform.

FIGS. 16, 17, and 18 represent a top, end and side view, respectively, showing generally the bed/rail system with forks 6. In one embodiment, the rails 31 may be located more towards the outside or more towards the center of the bed 13, depending on the intended use of the truck or other utility vehicle 3. Alternatively, the rails 31 may be located asymmetrically with respect to a centerline of the bed 13 running from the front of the truck 3 to the rear. The rails 31 may be further located on the same side of such a centerline (see FIG. 32), for example on the passenger's side. Two parallel rails 31 are provided through the length of the bed 13 from which the sides of the platform or forks 6 extend. Additional embodiments using a different number of rails, such as one or three, for example, are also contemplated.

Figure 19:
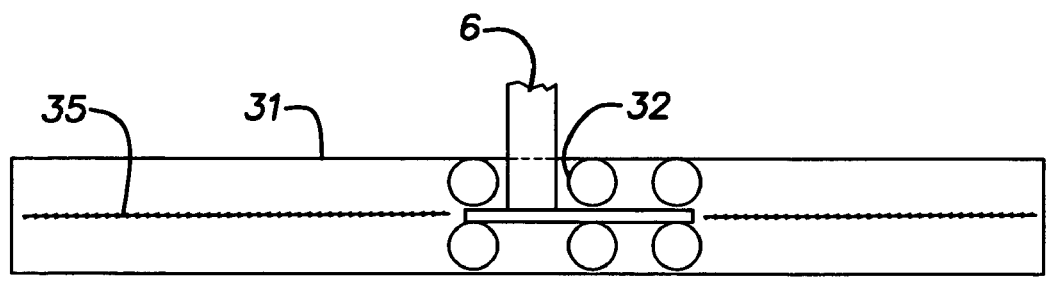
FIG. 19 is a side cross-sectional view of the bed/rail system with rigid platform and a cable for moving the platform along the rails.
Figure 20:
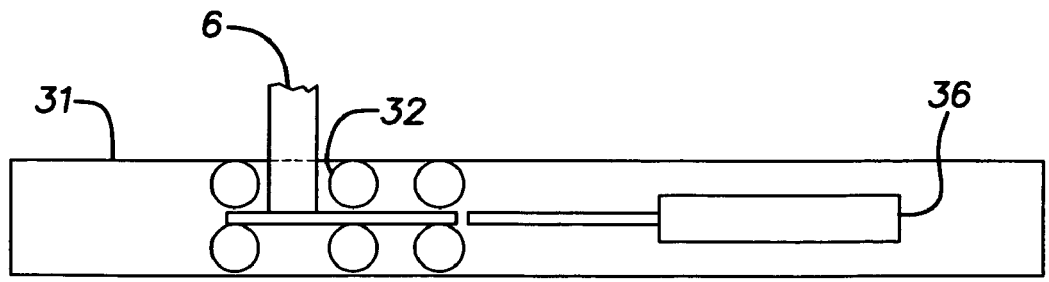
FIG. 20 is a side cross-sectional view of the bed/rail system with rigid platform and a hydraulic mechanism for moving the platform along the rails.
Figure 21:
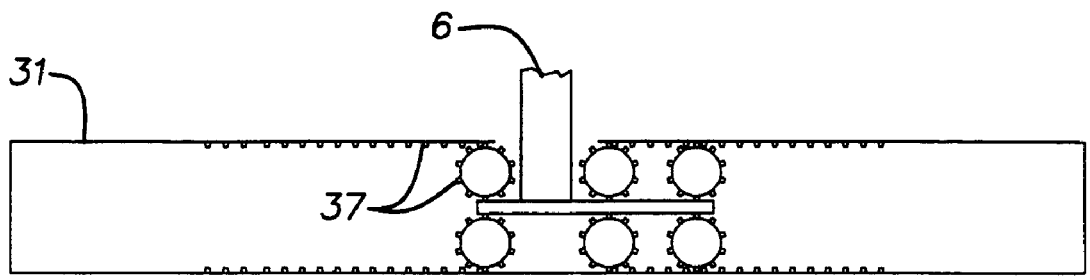
FIG. 21 is a side cross-sectional view of the bed/rail system with rigid platform and a tooth and gear system for moving the platform along the rails.

FIGS. 19, 20 and 21 represent various alternative examples for driving the platform or forks 6 through the rails 31. FIG. 19 shows an embodiment of the bed/rail system in which a cable 35 within the rail 31 is employed to move the platform or forks 6 along the length of the rail 31. One cable or multiple cables may be employed to drive a platform or fork(s) 6 located on one or more rails 31. A winch may be further employed to wind the cable(s) 35 and drive the platform or fork(s) 6. The platform 6 includes attached guide wheels 32 for moving along the rail 31. FIG. 20 shows yet another embodiment of the invention in which a hydraulic mechanism 36, for example a telescoping hydraulic cylinder, within the rails 31 is utilized to move the rigid platform 6 along the length of the rails 31. FIG. 21 shows still another embodiment of the bed/rail system, in which a tooth and gear system 37 within the rails 31 is used to move the rigid platform or forks 6 along length of the rails 31. Alternatively, the platform or forks 6 may travel using a screw drive located within the rail 31, or may be driven by a rack and pinion system, for example.

Figure 22:
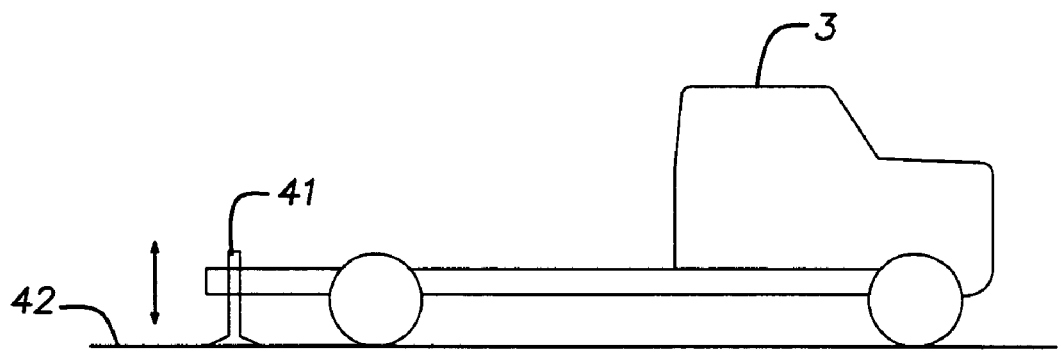
FIG. 22 is a side view of a vehicle having a stabilizing foot that can be extended or retracted during operation of the bed/rail system.

A further embodiment of the invention, shown in FIG. 22, contemplates the use of a stabilizing foot 41 at the rear of the vehicle 3, which can be extended to the ground 42 during operation of the bed/rail system to provided added stability when the bed/rail system is extended.

Figure 23:
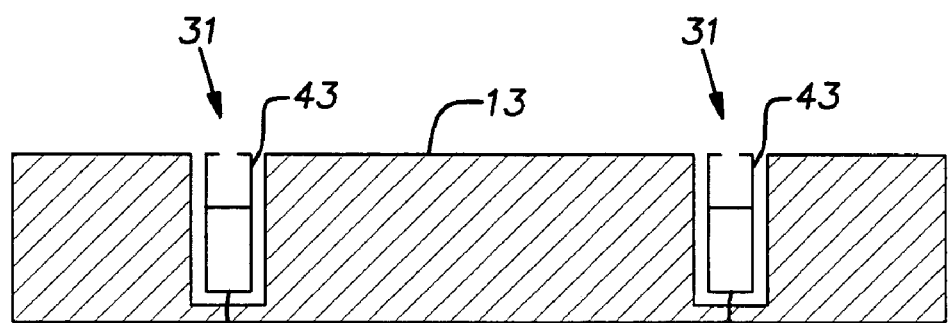
FIG. 23 is a cross-sectional view of a bed/rail system wherein the rails are comprised of a track portion and a beam portion.
Figure 24:
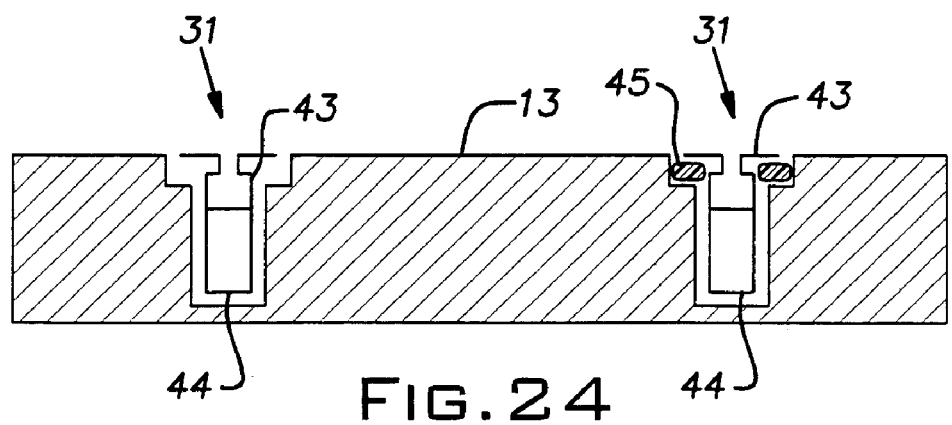
FIG. 24 is a cross-sectional view of a bed/rail system which includes a gasket and wherein the rails are comprised of a track portion and a beam portion.

Alternative embodiments of the rails 31 are provided in FIGS. 23 and 24. The rails 31 are comprised of a track portion 43 and a beam portion 44. The platform or forks ride within the track portion 43. The raising apparatus for the rails 31, for example a telescoping hydraulic cylinder jack, hydraulic ram, winch and pulley system, or other jacking mechanism, can be connected to the beam portion 44. A gasket 45 may be provided in the area where the track 31 is in close proximity to the surface of the bed 31 for keeping out debris and cushioning the track 31. A sliding cover, not illustrated, may also be used to keep the track 31 free of debris.

Figure 25:
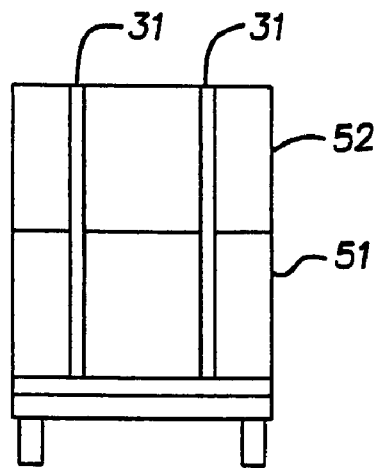
FIG. 25 is a rear elevation view of a vehicle having a bed/rail system and a bed comprised of two segments with both segments elevated.
Figure 26:
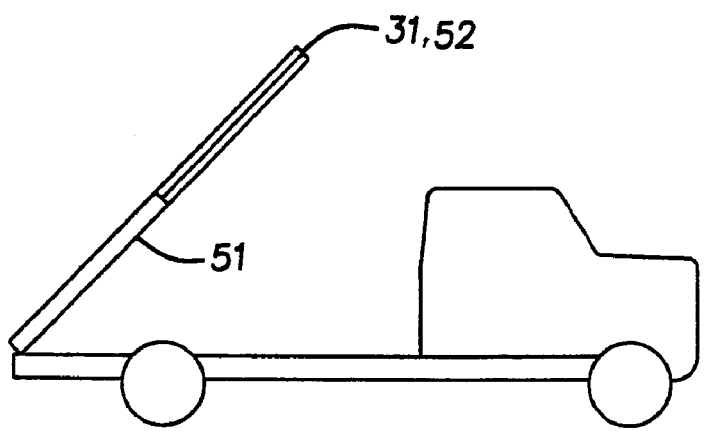
FIG. 26 is a side elevation view of a vehicle having a bed/rail system and a bed comprised of two segments with both segments elevated.
Figure 27:
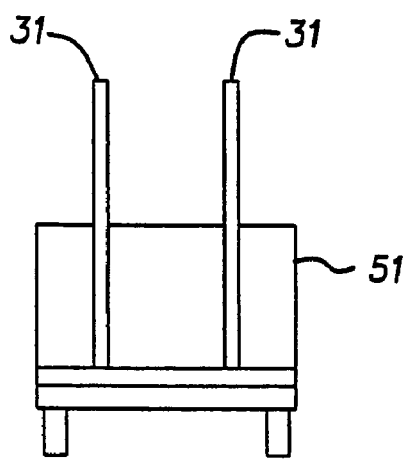
FIG. 27 is a rear elevation view of a vehicle having a bed/rail system and a bed comprised of two segments with one segment elevated.
Figure 28:
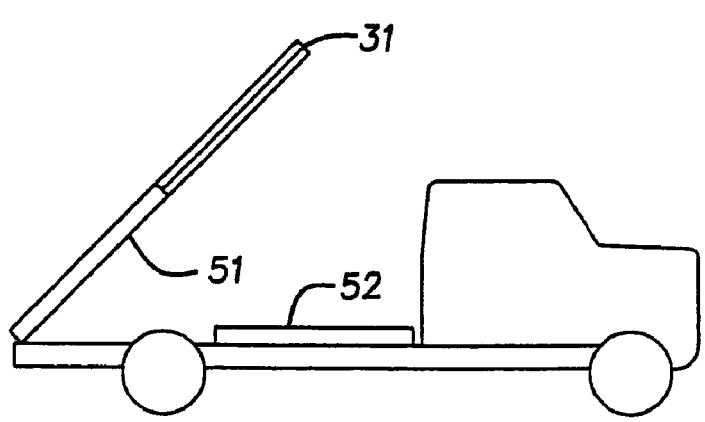
FIG. 28 is a side elevation view of a vehicle having a bed/rail system and a bed comprised of two segments with one segment elevated.
Figure 29:
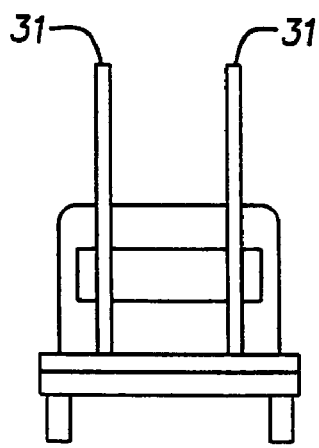
FIG. 29 is a rear elevation view of a vehicle having a bed/rail system and a bed comprised of two segments with neither segment elevated.
Figure 30:
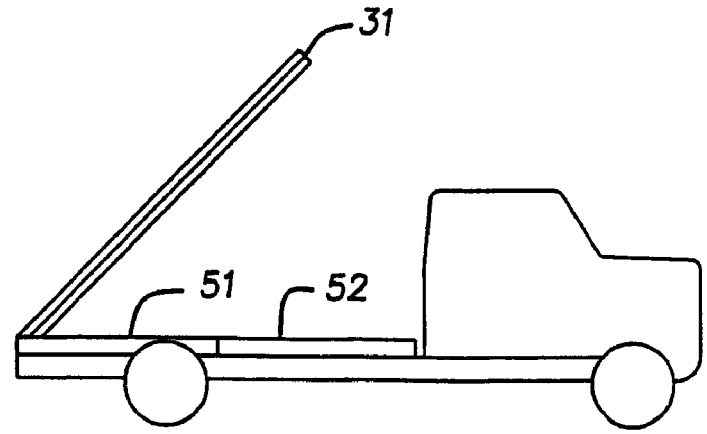
FIG. 30 is a side elevation view of a vehicle having a bed/rail system and a bed comprised of two segments with neither segment elevated.
Figure 31:
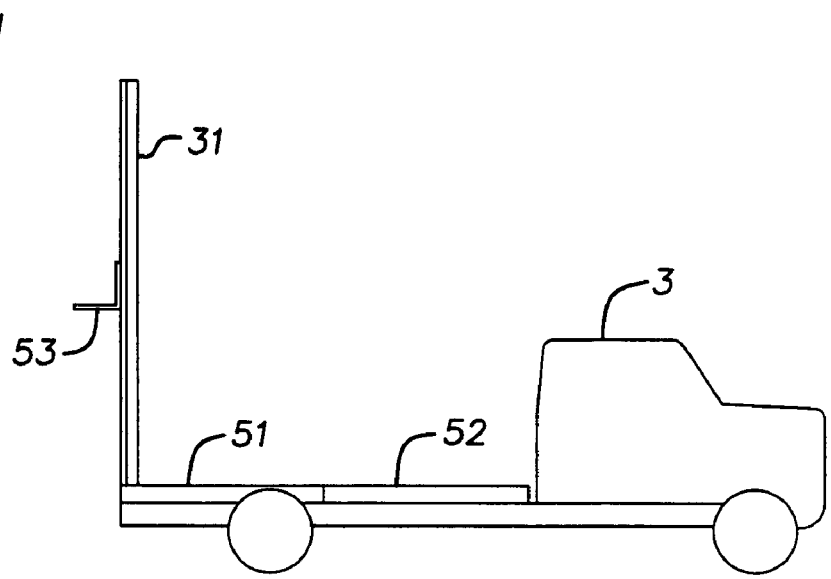
FIG. 31 is a side elevation view of a vehicle having a bed/rail system with an attached platform and a bed comprised of two segments with neither segment elevated.

FIGS. 25 through 31 detail an embodiment of the invention in which the truck bed is comprised of a first segment 51 and a second segment 52. The rails 31 are as previously described herein. As shown in FIGS. 25 and 26, both bed segments 51, 52 may be secured to the rails 31 and raised along with the rails 31. Alternatively, as can be seen in FIGS. 27 and 28, one segment may be a fixed segment, for example the second segment 52, while the other segment is a pivoting segment, for example the first segment 51. In such a configuration, the pivoting segment is secured to and moves with the rails 31, while the fixed segment remains horizontal. If neither the first nor second bed segments 51, 52 are secured to the rails, the segments would both remain horizontal when the rails 31 are raised, as can be seen in FIGS. 29 and 30. FIG. 31 shows a side view of a vehicle 3 with the rails 31 raised and with a platform 53 attached to the rails 31. The first and second bed segments 51, 52 remain horizontal in this embodiment when the rails are raised.

Figure 32:
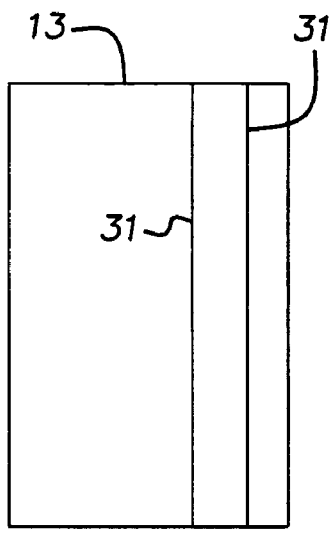
FIG. 32 is a top view of a bed with two rails that are located on the same side of the bed.
Figure 33:
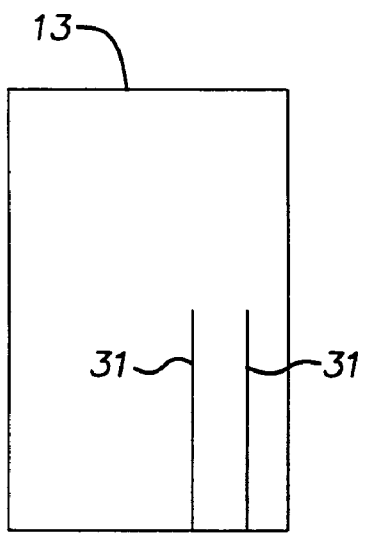
FIG. 33 is a top view of a bed with two rails that are located on the same side of the bed and which extend along a portion of the bed.
Figure 34:
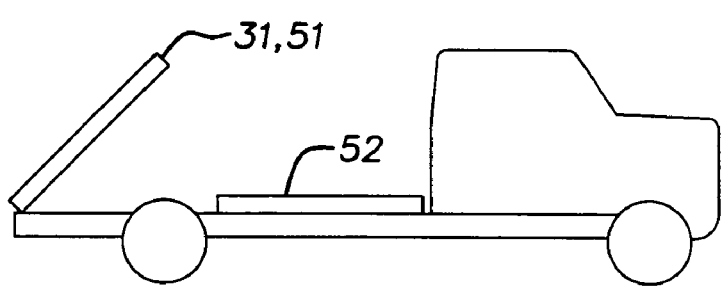
FIG. 34 is a side elevation view of a vehicle having a bed/rail system with short rails and a bed comprised of two segments with one segment elevated.
Figure 35:
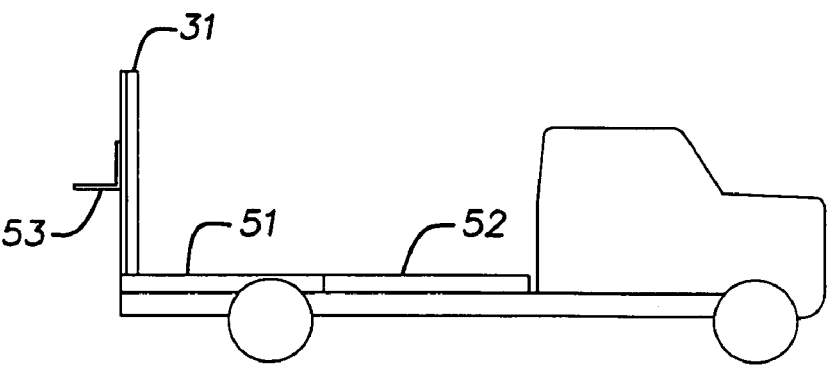
FIG. 35 is a side elevation view of a vehicle having a bed/rail system with short rails, an attached platform, and a bed comprised of two segments with neither segment elevated.

As previously described, the rails 31 may be asymmetrically located with respect to a centerline of the bed 13. FIG. 32 shows such a configuration. The rails 31 may run for the entire length of the entire length of the bed, or a portion thereof. For example, as shown in FIG. 33, the rails may run for only a portion of the bed 13. FIGS. 34 and 35 show side views of such an embodiment. FIG. 34 shows the rails 31 attached to a first bed segment (pivoting segment) 51, while a second bed segment (fixed segment) 52 remains horizontal. FIG. 35 shows the first and second bed segments 51, 52 as remaining horizontal, while the rails 31 have been raised and a platform 53 attached thereto. The rails 31 may be telescoping rails that are extendable from a first length to a second length.

An alternative embodiment may include a scaffolding which attaches to the rails, rather than a platform or forks as previously describe. Raising the rails from the truck bed would deploy the scaffolding. The scaffolding could then be vertically position along the length of the rails to a desired height. A further alternative embodiment includes a work platform attached to the rails, rather than a scaffolding. The work platform includes single work surface and guardrails and is deployed in a manner similar to the scaffolding. The bed/rail system described herein can be adjustable so that a platform or forks could be quickly removed and replaced with other tools, for example the scaffolding or work platform.

The bed/rail system described hereinabove may be installed on a truck, for example a 1-ton pickup truck, or other utility vehicle. The system may be installed during initial assembly of the vehicle. Alternatively, the system may be installed after the vehicle is assembled and serve as a modification to the vehicle. If installed as a modification to an assembled vehicle, the system may be installed in an existing bed (if present) by modifying the bed or in a replacement bed that has been adapted as described herein.

The invention has been described hereinabove using specific examples; however, it will be understood by those skilled in the art that various alternatives may be used and equivalents may be substituted for components or steps described herein, or the order of steps may be changed, or substitutes for the described components provided, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

What is claimed is:

1. A cargo loading and unloading system for a vehicle, comprising:
    a rail pivotally connected to the vehicle and deployable from a rest position to an elevated position;
    a bed forming a lengthwise opening for receiving the rail in the rest position;
    a raising apparatus for raising the rail from the rest position to the elevated position;
    a lifting attachment that projects from the rail and which is moveable along a portion of the rail;
    a lifting attachment driving mechanism for moving the lifting attachment along the portion of the rail;
    and means for releasably securing the bed to said rail;
    wherein the bed is pivotally connected to the vehicle such that the bed will pivot during a raising of said rail when the bed is secured to said rail.

2. The system as set forth in claim 1, further comprising:
    another rail pivotally connected to the vehicle.

3. The system as set forth in claim 2, further comprising:
    another lifting attachment that projects from said another rail and which is moveable along a portion of said another rail; and
    another lifting attachment driving mechanism for moving said another lifting attachment along the portion of said another rail, wherein the raising apparatus also raises said another rail.

4. A cargo loading and unloading system for a vehicle, comprising:
    a bed forming a lengthwise opening;
    a rail pivotally connected to the bed and deployable from a rest position that is substantially parallel to the bed at rest through an elevated position that is substantially perpendicular to the bed at rest, wherein the rail is located within the lengthwise opening in the bed while in the rest position;
    another rail pivotally connected to the bed;
    a raising apparatus for raising the rail from the rest position through the elevated position;
    a lifting attachment that projects from the rail and which is moveable along a portion of the rail;
    a lifting attachment driving mechanism for moving the lifting attachment along the portion of the rail;
    and means for securing the bed to one or both of said rail and said another rail;
    wherein the bed is pivotally connected to the vehicle such that the bed will pivot during a raising of one or both of said rail and said another rail when the bed is secured to said one or both of said rail and said another rail.

5. The system as set forth in claim 4, further comprising:
    another lifting attachment that projects from said another rail and which is moveable along a portion of said another rail.

6. The system as set forth in claim 5, further comprising: another lifting attachment driving mechanism for moving said another lifting attachment along the portion of said another rail, wherein the raising apparatus also raises said another rail.

7. The system of claim 4, wherein the raising apparatus includes a scissor jack.

8. The system of claim 4, wherein the raising apparatus includes a telescoping hydraulic cylinder jack.

9. A cargo loading and unloading system for a vehicle having a bed, comprising:
   a rail pivotally connected to the bed and extending within a lengthwise opening in the bed while in a rest position that is substantially parallel to the bed at rest;
   a raising apparatus for raising the rail from the rest position to an elevated position that is substantially perpendicular to the bed at rest;
   a fork that projects from the rail and which is moveable along a portion of the rail; and
   a driving mechanism for moving the fork along the portion of the rail;
   and a pin for releasably securing the bed to said rail;
   wherein the bed is pivotally connected to the vehicle such that the bed will pivot during a raising of said rail when the bed is secured to said rail.

10. The system of claim 9, further comprising:
    another rail pivotally connected to the bed and extending through another opening in the bed; and
    another fork that projects from the another rail and which is moveable along a portion of the another rail.

11. A cargo loading and unloading system for a vehicle, comprising:
    a bed;
    a first rail pivotally connected to the bed and extending within a first lengthwise opening in the bed while in a rest position that is substantially parallel to the bed at rest;
    a second rail pivotally connected to the bed and extending within a second lengthwise opening in the bed while in the rest position;
    a raising apparatus for raising the rails from the rest position through an elevated position that is substantially perpendicular to the bed at rest;
    a first fork that projects from the first rail and which is moveable along a portion of the first rail;
    a second fork that projects from the second rail and which is moveable along a portion of the second rail;
    a driving mechanism for moving one or both of the first fork along the portion of the first rail and the second fork along the portion of the second rail;
    and at least one pin for securing the bed to one or both of the first rail and the second rail;
    wherein the bed is pivotally connected to the vehicle such that the bed will pivot during a raising of one or both of the first rail and the second rail when the bed is secured to said one or both of the first rail and the second rail.

12. A cargo loading and unloading system for a vehicle having a bed, comprising:
    a first rail pivotally connected to the bed and extending through a first lengthwise opening in the bed, wherein the first rail includes a first channel along a part of its length;
    a second rail pivotally connected to the bed and extending through a second lengthwise opening in the bed, wherein the second rail includes a second channel along a part of its length; and
    a raising apparatus for raising one or both of the first rail and the second rail from a rest position that is substantially parallel to the bed at rest to an elevated position that is substantially perpendicular to the bed at rest, wherein the first rail is located within the first lengthwise opening when in the rest position and wherein the second rail is located within the second lengthwise opening when in the rest position;
    wherein the bed is pivotally connected to the vehicle and wherein a means for releasably securing the bed to the first rail and the second rail is provided such that the bed will pivot during a raising of the first rail and the second rail when the bed is secured to one or more of the first rail and the second rail.

13. The system set forth in claim 12, further comprising: a scaffolding attached to the first rail and the second rail; and a driving mechanism for moving the scaffolding along the first rail and the second rail.

14. The system set forth in claim 12, further comprising: a platform attached to the first rail and the second rail; and a driving mechanism for moving the platform along the first rail and the second rail.

15. The system set forth in claim 14, further comprising: a swinging platform attachment attached to the platform.

16. The system set forth in claim 14, wherein the platform remains substantially horizontal when the first rail and the second rail are raised or lowered.

17. The system set forth in claim 12, further comprising a stabilizing foot for stabilizing the vehicle, said stabilizing foot being connected to the vehicle and extendable to an external surface.

18. The system set forth in claim 12, further comprising: a first fork which projects from the first rail and which is movable along the first channel; and a second fork which projects from the second rail and which is movable along the second channel.

19. The system set forth in claim 18, further comprising:
    a swinging platform attachment attached to one or more of the first fork and the second fork, wherein the platform attachment remains substantially horizontal when the first fork or the second fork are raised or lowered.

20. The system set forth in claim 18, further comprising:
    a first fork extension that is extendable from and retractable to the first fork; and
    a second fork extension that is extendable from and retractable to the second fork.

21. The system set forth in claim 18, further comprising:
    a first plurality of wheels connected to the first fork and located within the first rail;
    a second plurality of wheels connected to the second fork and located within the second rail; and
    a cable for moving one or more of the first fork and the second fork.

22. The system set forth in claim 21, further comprising: a winch for winding the cable.

23. The system set forth in claim 18, further comprising:
    a first plurality of wheels connected to the first fork and located within the first rail;
    a second plurality of wheels connected to the second fork and located within the second rail;
    a first hydraulic mechanism for moving the first fork along the first channel; and
    a second hydraulic mechanism for moving the second fork along the second channel.

24. The system set forth in claim 18, wherein the first rail includes a first tooth and gear system for moving the first fork along the first channel, and further wherein the second rail includes a second tooth and gear system for moving the second fork along the second channel.

25. The system set forth in claim 18, wherein the first rail includes a first screw drive system for moving the first fork along the first channel, and further wherein the second rail includes a second screw drive system for moving the second fork along the second channel.

26. The system set forth in claim 12, wherein the first rail and the second rail are extendable from a first length to a second length.

27. A cargo loading and unloading system for a vehicle having a bed, comprising:
  a first rail pivotally connected to the bed and extending through a first lengthwise opening in the bed, wherein the first rail includes a first channel along a part of its length;
  a second rail pivotally connected to the bed and extending through a second lengthwise opening in the bed, wherein the second rail includes a second channel along a part of its length; and
  a raising apparatus for raising one or both of the first rail and the second rail from a rest position that is substantially parallel to the bed at rest to an elevated position that is substantially perpendicular to the bed at rest, wherein the first rail is located within the first lengthwise opening when in the rest position and wherein the second rail is located within the second lengthwise opening when in the rest position;
  wherein the bed is comprised of a pivoting segment and a fixed segment;
  wherein the pivoting segment is pivotally connected to the vehicle such that the pivoting segment will pivot during a raising of the first rail and the second rail when the pivoting segment is secured to one or more of the first rail and the second rail while the fixed segment does not pivot.

28. A cargo loading and unloading system for a vehicle, comprising:
  a bed;
  a first rail pivotally connected to the bed and extending within a first lengthwise opening in the bed while in a rest position that is substantially parallel to the bed at rest, wherein the first rail is comprised of a first beam and a first track;
  a second rail pivotally connected to the bed and extending within a second lengthwise opening in the bed while in the rest position, wherein the second rail is comprised of a second beam and a second track;
  a raising apparatus for raising the first rail and the second rail from the rest position through an elevated position that is substantially perpendicular to the bed at rest;
  a first fork which projects from the first rail and which is movable along the first track;
  a second fork which projects from the second rail and which is movable along the second track;
  means for securing the bed to one or more of the first rail and the second rail;
  wherein the bed is pivotally connected to the vehicle such that the bed will pivot during a raising of one or both of first rail and the second rail when the bed is secured to said one or both of first rail and the second rail.

29. A method of modifying a truck, comprising the steps of:
  providing a truck with an existing bed;
  and replacing the existing bed with the loading and unloading system of claim 4.

30. A method of modifying a truck, comprising the steps of:
  providing a truck with an existing bed;
  and replacing the existing bed with the loading and unloading system of claim 11.

31. A method of modifying a truck, comprising the steps of:
  providing a truck having a bed pivotally connected to the truck, wherein the bed forms a first lengthwise opening and a second lengthwise opening;
  providing a first rail, a second rail, a raising apparatus, and a lifting attachment;
  installing the first rail and the second rail on the truck so that the first rail and the second rail are able to pivot from a rest position within the first lengthwise opening and the second lengthwise opening, respectively, and away from the bed and the first rail and the second rail are installed so that the bed will pivot during a raising of one or both of the first rail and the second rail when the bed is secured to one or both of the first rail and the second rail;
  installing the raising apparatus so that the raising apparatus is able to raise one or more of the first rail and the second rail from the rest position that is substantially parallel to the bed at met through an elevated position that is substantially perpendicular to the bed at rest; and
  attaching the lifting attachment to one or both of the first rail and the second rail.

32. A method of constructing a truck; comprising the steps of:
  providing a truck without a bed; and
  installing the system of claim 4 on the truck.

33. A method of constructing a truck, comprising the steps of:
  providing a truck without a bed; and
  installing the system of claim 11 on the truck.

34. The system set forth in claim 2, wherein the rail and the another rail are asymmetrically located with respect to a centerline of the bed.

35. The system set forth in claim 14, wherein the platform is a work platform that includes guardrails.

* * * * *

UNITED STATES PATENT AND TRADEMARK OFFICE
CERTIFICATE OF CORRECTION

PATENT NO.        : 7,513,731 B2
APPLICATION NO. : 10/935561
DATED             : April 7, 2009
INVENTOR(S)       : Studer It is certified that error appears in the above-identified patent and that said Letters Patent is hereby corrected as shown below:

In the specification, column 2, line 60, please remove the number "1",

In the claims, column 12, line 33, please replace the word "met" with -rest-.

Signed and Sealed this

Twenty-third Day of June, 2009

JOHN DOLL
*Acting Director of the United States Patent and Trademark Office*